No. 691,918. Patented Jan. 28, 1902.
E. H. SNYDER.
DEVICE FOR HANDLING, DRAINING, AND DISPLAYING FISH.
(Application filed July 16, 1901.)
(No Model.)
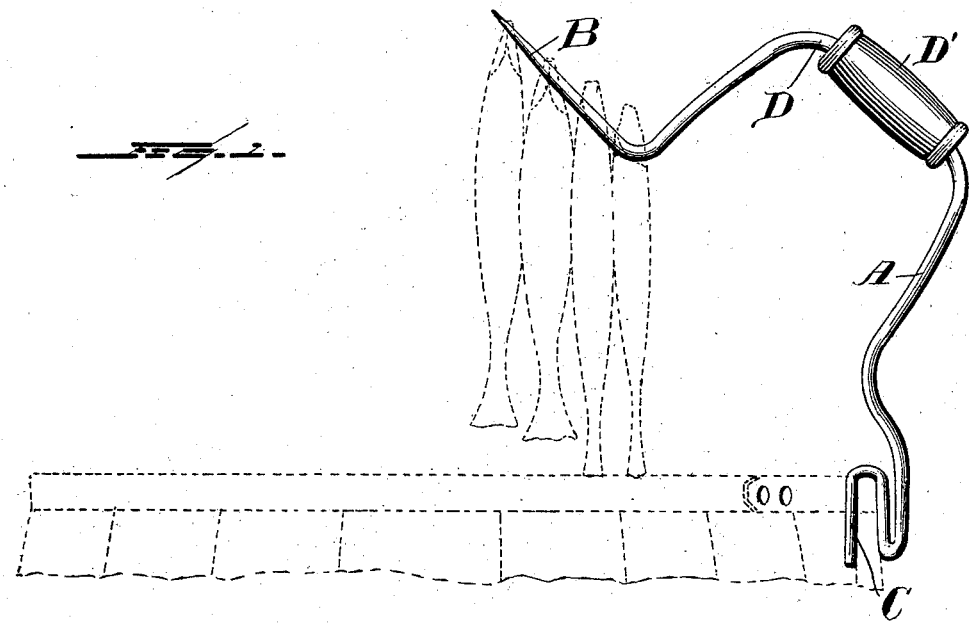
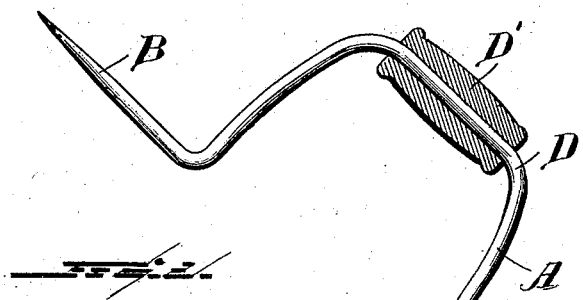
WITNESSES:
INVENTOR
E. H. Snyder,
by Franklin H. Hoyt
Attorney

UNITED STATES PATENT OFFICE.

EPHRAIM H. SNYDER, OF HAGERSTOWN, MARYLAND.

DEVICE FOR HANDLING, DRAINING, AND DISPLAYING FISH.

SPECIFICATION forming part of Letters Patent No. 691,918, dated January 28, 1902.

Application filed July 16, 1901. Serial No. 68,524. (No model.)

*To all whom it may concern:*

Be it known that I, EPHRAIM H. SNYDER, a citizen of the United States, residing at Hagerstown, in the county of Washington and State of Maryland, have invented certain new and useful Improvements in Devices for Handling, Draining, and Displaying Fish, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements for use in handling, draining, and displaying fish, meats, &c., and articles of this character which are kept in brine or other liquids. It has long been customary for dealers in mackerel, corned meats, &c., to pack the same in casks or barrels, the containing brine or other liquid substance adapted to act as a preservative. In order to select from the cask or other receptacle containing the merchandise samples satisfactory to the wants of the customer, it is frequently found necessary for the merchant to handle the contents of the barrel or cask, and the sorting of material contained within the preserving liquid is attended with serious inconvenience.

The present invention has for its object the provision of a simple, inexpensive, and practical device especially adapted for use in removing from casks, barrels, or other receptacles fish or meats immersed therein.

The invention has for a further object the provision of means whereby the device thus employed in removing the contents of the cask or barrel may be readily secured or clamped to the upper edge of the receptacle in such position as to suspend above the barrel or cask the fish or meats, so that the liquid draining from the article will return to the receptacle.

To these ends and to such others as the invention may pertain the same consists in the novel construction and in the peculiar arrangement, combination, and adaptation of parts, all as more fully hereinafter described, shown in the accompanying drawings, and then specifically defined in the appended claim.

The invention is clearly illustrated in the accompanying drawings, which form a part of this specification, and in which—

Figure 1 is a side elevation of my improved device, the same being shown as in position for retaining the fish or other articles in a position for drainage and display, the fish and upper edge of the barrel being indicated in dotted lines. Fig. 2 is a side elevation of the device removed from the barrel, the handle being shown in section.

Reference now being had to the details of the drawings by letter, A designates the device, which is constructed of a strong piece of wire or other suitable material bent to form at one of its ends a pointed tine or hooked portion B, and at its opposite end the wire is bent to form an open looped portion C, adapted to be fitted over the edge of the barrel, box, or other receptacle. The portion of the device intermediate of the tine or hook B and clamp C is bent to form a bail or handle portion D, which handle portion may, if preferred, be provided with a suitable handle D'.

The use of the device will, from the foregoing description, in connection with the illustrations shown in the drawings, be at once evident. When it is desired to remove a fish or other substance contained in the barrel or other receptacle, it is simply necessary to grasp the device by the handle D' and insert the tine or hooked portion B into the article to be removed from the brine, when the same may be readily lifted out of the receptacle. In order that the brine may be drained back into the receptacle, it is simply necessary to clamp the device over the edge of the receptacle in such a position as to hold the article upon the tine suspended over the open upper end of the same.

It will be noted that the device is peculiarly adapted not only for use in draining the fish or meat, but also for holding the same above the barrel in such a position as to display the goods to advantage.

Having thus described my invention, what

I claim to be new, and desire to secure by Letters Patent, is—

A device for holding fish, &c., comprising a rod A bent upon itself to form a hook at one end thereof and adapted to engage over the edge of a receptacle, a handle and curved portion of the rod on which said handle is mounted, the other end of the rod being pointed and disposed at an inclination over the receptacle to which the rod is held, as set forth.

In testimony whereof I hereunto affix my signature in presence of two witnesses.

EPHRAIM H. SNYDER.

Witnesses:
 EZRA NEWCOMER,
 NERVIN J. BRANDT.